United States Patent
Piel et al.

(10) Patent No.: US 10,445,125 B2
(45) Date of Patent: Oct. 15, 2019

(54) METHOD AND DEVICE FOR SECURING THE APPLICATION PROGRAMMING INTERFACE OF A HYPERVISOR

(71) Applicant: Robert Bosch GmbH, Stuttgart (DE)

(72) Inventors: Gunnar Piel, Hemmingen (DE); Gary Morgan, Thixendale (GB)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 15/221,138

(22) Filed: Jul. 27, 2016

(65) Prior Publication Data
US 2017/0031702 A1  Feb. 2, 2017

(30) Foreign Application Priority Data
Jul. 29, 2015  (DE) .......... 10 2015 214 385

(51) Int. Cl.
| | | |
|---|---|---|
| G06F 9/455 | (2018.01) | |
| G06F 21/00 | (2013.01) | |
| G06F 8/71 | (2018.01) | |
| G06F 9/54 | (2006.01) | |
| G06F 21/53 | (2013.01) | |
| G06F 9/445 | (2018.01) | |

(52) U.S. Cl.
CPC .......... *G06F 9/45558* (2013.01); *G06F 9/547* (2013.01); *G06F 9/548* (2013.01); *G06F 21/00* (2013.01); *G06F 21/53* (2013.01); *G06F 8/71* (2013.01); *G06F 9/44536* (2013.01); *G06F 2009/45583* (2013.01); *G06F 2009/45587* (2013.01)

(58) Field of Classification Search
CPC ........ G06F 9/45533; G06F 21/53; G06F 8/51; G06F 9/44589; G06F 17/5004
See application file for complete search history.

(56) References Cited

U.S. PATENT DOCUMENTS

| | | | | |
|---|---|---|---|---|
| 5,481,708 A | * | 1/1996 | Kukol ..................... | G06F 8/443 717/155 |
| 5,761,510 A | * | 6/1998 | Smith, Jr. ........... | G06F 11/3684 714/E11.208 |
| 6,066,181 A | * | 5/2000 | DeMaster ................. | G06F 8/30 717/148 |

(Continued)

FOREIGN PATENT DOCUMENTS

| | | |
|---|---|---|
| CN | 1989471 A | 6/2007 |
| JP | 10214191 A * | 8/1998 |

OTHER PUBLICATIONS

Tony, "Add new Hypercall in Xen". Jul. 2014. Virtualization Blog. Website Address: https://focusvirtualization.blogspot.com/2014/07/virtualization-58add-new-hypercall-in.html (Year: 2014).*

*Primary Examiner* — Lewis A Bullock, Jr.
*Assistant Examiner* — Gilles R Kepnang
(74) *Attorney, Agent, or Firm* — Norton Rose Fulbright US LLP; Gerard Messina

(57) ABSTRACT

A method for securing an application programming interface of a utility program library, including at least one program construct, of a hypervisor, including a configuration of the hypervisor that assigns at least one permissible call of the program construct to at least one guest system of the hypervisor, and a code generation, supported by the configuration, of a declaration of the program construct adapted to the guest system.

9 Claims, 2 Drawing Sheets

(56) References Cited

U.S. PATENT DOCUMENTS

| | | | | |
|---|---|---|---|---|
| 6,370,682 B1* | 4/2002 | Eckardt | ...................... | G06F 8/34 |
| | | | | 717/106 |
| 6,698,011 B1* | 2/2004 | Reinders | ................... | G06F 8/51 |
| | | | | 714/38.14 |
| 7,577,991 B2 | 8/2009 | Huynh et al. | | |
| 7,954,156 B2 | 5/2011 | Huynh et al. | | |
| 8,516,508 B1* | 8/2013 | Tran | ........................... | G06F 8/30 |
| | | | | 717/106 |
| 2006/0248528 A1* | 11/2006 | Oney | ................... | G06F 9/45533 |
| | | | | 718/1 |
| 2009/0044274 A1* | 2/2009 | Budko | .................... | G06F 21/53 |
| | | | | 726/24 |
| 2009/0172652 A1* | 7/2009 | Simon | ...................... | G06F 8/443 |
| | | | | 717/148 |
| 2009/0210888 A1* | 8/2009 | Lee | ........................ | G06F 9/4812 |
| | | | | 719/321 |
| 2009/0217245 A1* | 8/2009 | Iyer | ..................... | G06F 9/44589 |
| | | | | 717/126 |
| 2010/0292867 A1* | 11/2010 | Bohm | ..................... | B60W 50/06 |
| | | | | 701/1 |
| 2012/0304162 A1* | 11/2012 | Yamauchi | ................. | G06F 8/65 |
| | | | | 717/170 |
| 2013/0024836 A1* | 1/2013 | Koerner | ............. | G06F 17/5004 |
| | | | | 717/107 |
| 2014/0208302 A1* | 7/2014 | Paul | .......................... | G06F 8/65 |
| | | | | 717/170 |

* cited by examiner

METHOD AND DEVICE FOR SECURING THE APPLICATION PROGRAMMING INTERFACE OF A HYPERVISOR

CROSS REFERENCE

The present application claims the benefit under 35 U.S.C. § 119 of German Patent Application No. DE 102015214385.6 filed on Jul. 29, 2015, which is expressly incorporated herein by reference in its entirety.

FIELD

The present invention relates to a method for securing the application programming interface of a hypervisor. In addition, the present invention relates to a corresponding device, a corresponding computer program, and a corresponding storage medium.

BACKGROUND INFORMATION

Conventional hypervisors (or: virtual machine monitors, VMM) have an application programming interface (API) for the guest system. Such application programming interfaces typically permit a guest system to use a utility program library of the hypervisor in order to interact with it. For example, the existing art includes utility program libraries that enable a query of the status of further guest systems or of the hypervisor itself. The guest system can also be permitted to issue certain commands to the hypervisor.

Strictly speaking, this interaction can be regarded as a violation of a paradigm of strict isolation, according to which any interaction between the hypervisor and the guest systems is to be refused. Therefore, each use of the application programming interface requires a strict design justification. In addition, a hypervisor and guest systems must have a common understanding of syntax and semantics.

China Patent Application No. CN1989471A describes a system and method for reducing the external access to hypervisor interfaces in a computer system, whereby the possibility of attacks is to be reduced. In a preferred specific embodiment, the addresses for calls are used to fill a table in which the addresses are specifically selected for a requesting computer. For example, in a specific embodiment a routine can search the adapter type of a requesting computer and can fill the table with calls specific for this type of adapter. Other types of calls are not stored in the table. Instead, these calls are replaced by routines that return an error.

SUMMARY

The present invention provides a method for securing the application programming interface of a hypervisor, a corresponding device, a corresponding computer program, and a corresponding storage medium.

An advantage of the present invention is the early recognition of violations of the access rights of guest systems to the application programming interface at the time of translation. Already in this phase, an example method also enables the discovery of possible syntactic or semantic incompatibilities between the guest system and hypervisor with regard to its application programming interface.

In various refinements of the present invention, it can be provided that the configuration additionally assigns to the hypervisor a hypervisor version, and, during the code generation, in addition a source code of the hypervisor is produced that codes the assignment of the hypervisor version and of the programming construct. The generated hypervisor is thus able to recognize version incompatibilities and violations of access rights even during its runtime. In a modification, this configuration is not based on a code generation, but rather is read in from a configuration data file when the hypervisor is started up.

According to a further aspect, it can be provided that the assignment further assigns to the call a version of the methods included by the utility program library, and that during the code generation a header data file is produced that contains the declaration of these methods. In this way, the programmer of the guest system can use the application programming interface, naming the method name including the version, as long as he incorporates the header data file in the development process as translation unit. An attempt to call an impermissible method will therefore cause an error at the time of translation. The same holds correspondingly if the relevant method is permissible but the guest system uses a different version of it.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
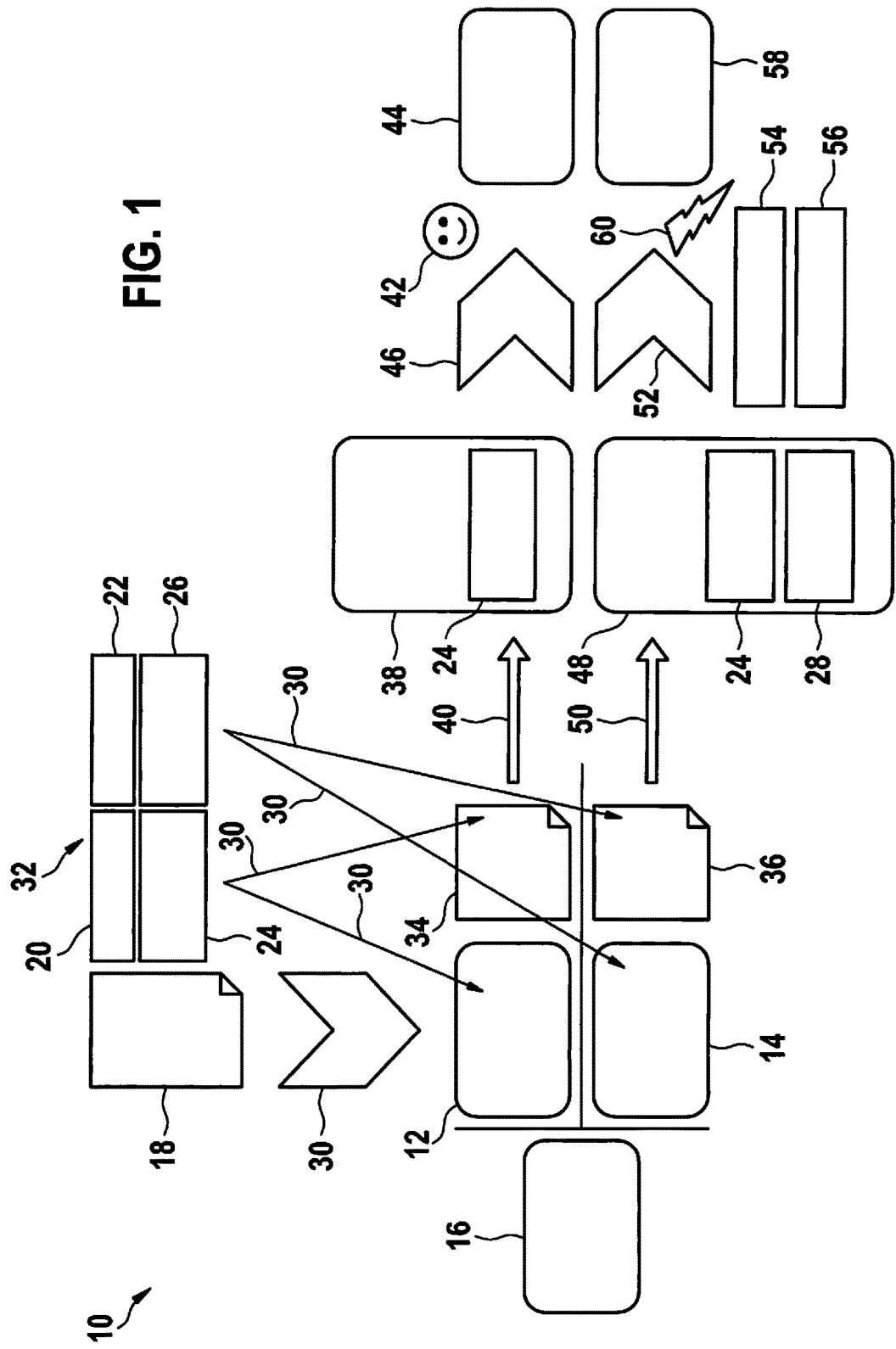
FIG. 1 shows an example of a method according to a first specific embodiment.

FIG. 1 illustrates the sequence of a method 10 according to the present invention for securing an application programming interface of utility program library 12, 14 of a hypervisor 16. Object-oriented utility program library 12, 14 includes, in this example, two methods "a" and "b" that are to be used by a first guest system 20 and a second guest system 22 of hypervisor 16. Configuration 18 of hypervisor 16 here assigns to first guest system 20 a call 24 of first method "a" in a version "1.0," and assigns to second guest system 22 the corresponding call 26 of second method "b" in a version "1.5," as permissible (32). Configuration 18 further assigns a hypervisor version to hypervisor 16.

Supported by the described configuration 18, code generation 30 of the source code of hypervisor 16 now takes place. The assigned hypervisor version here enters into the source code as the allocation 32 of call 24 of first method "a," in the version "1.0," to first guest system 20, as well as of call 26 of second method "b," in the version "1.5," to second guest system 22. The subject matter of code generation 30 also includes utility program library 12, 14 itself, as well as declarations of the application programming interface adapted to the respective guest system 24, 26. (Hypervisor 16 can also be static, and its configuration can be read in from a configuration data file upon starting up, without departing from the scope of the present invention.) In detail, for this purpose a first header data file 34 is produced having a functional prototype of first method "a" and a second header data file 36 is produced having a functional prototype of second method "b." The designator of first method "a" here contains its version "1.0" used by first guest system 24, while that of second method "b" contains its version "1.5" used by second guest system 22.

Thus, if first header data file 34 is now included in source code 38 of first guest system 20 (include 40), then this system can be translated (46) without error (42) into corresponding object code 44, as long as it contains only call 24 of first method "a" in the version "1.0." The procedure is somewhat different for source code 48 of second guest system 22, with inclusion 50 of second header data file 36, which also contains call 24 of first method "a" in the version "1.0" as well as, additionally, a call 28 of second method "b" in the version "2.0": here, the lack of corresponding functional prototypes causes a first translation error 54 during the attempt at a translation 52, because a call 24 of first method "a" by second guest system 22 is entirely absent. A second translation error 56 occurs because, while in principle a call 26 of second method "b" by second guest system is indeed allowed, this call 26 however has assigned to it not version "2.0," but rather version "1.5" (32).

The production of an otherwise incorrect object code 58 is thus avoided through the failure 60 of translation 52.

Figure 2:
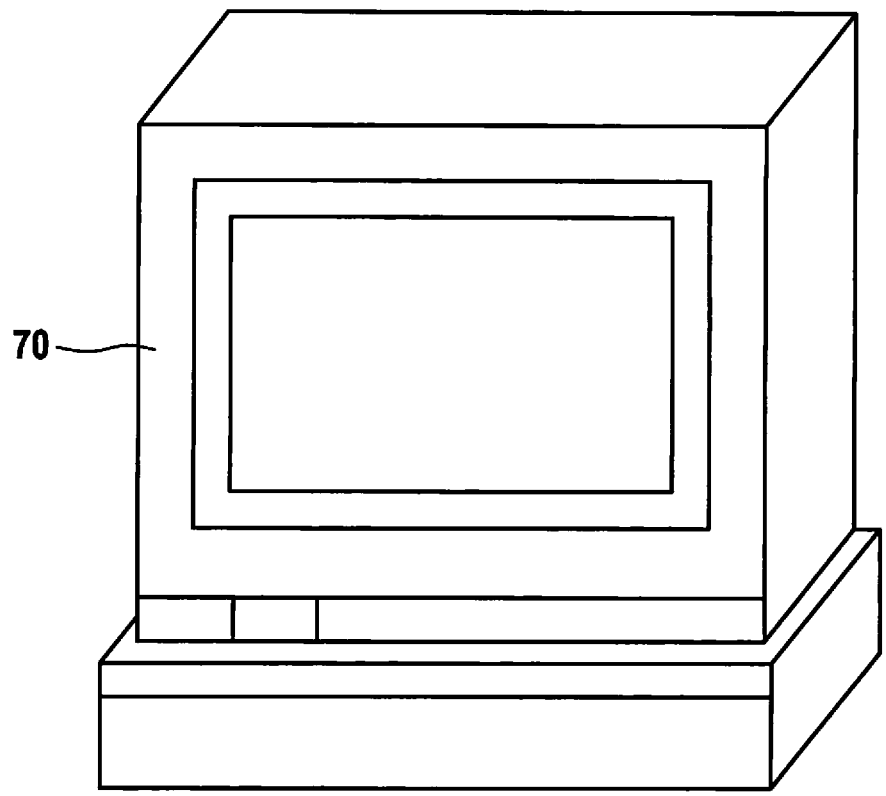
FIG. 2 schematically shows a device according to a second specific embodiment.

This method 10 can be implemented for example in software or hardware, or in a mixed form of software and hardware, for example in a workplace computer 70, as is illustrated in the schematic representation of FIG. 2.

What is claimed is:

1. A method for securing an application programming interface of a utility program library, the method comprising:
   assigning, via a processor, by a configuration of a hypervisor, at least one permissible call of a function, with a first version number, to at least one guest system of the hypervisor, the first version number being in accordance with the configuration of the hypervisor;
   generating source code, via the processor, supported by the configuration, for a function prototype of the function, the function prototype being adapted to the guest system, and the function prototype further corresponding to the at, least, one permissible call;
   storing the source code for the function prototype in a header file;
   adding the header file to a guest-specific source code, the guest-specific source code having the at least one permissible call specific to the guest system, and the header file including a second version number;
   translating the guest-specific source code, including the reader file, into an object code;
   while performing the translating, securing the application prototype by:
      determining whether the guest-specific source code is missing one or more function prototypes of the function;
      in response to determining that the guest-specific source code is missing the one or more function prototypes, indicating a first failure representing an otherwise incorrect object code and avoiding production of the incorrect object code;
      in response to determining that the guest-specific source code has the one or more function prototypes:
         comparing the second version number to the first version number;
         in response to the second version number not matching the first version number, indicating a second failure of the translation; and
         in response to the second version number matching the first version number, allowing the guest system of the hypervisor to perform the at least one permissible call.

2. The method as recited in claim 1, wherein during the code generation, the utility program library is produced.

3. The method as recited in claim 1, wherein the utility program library is object-oriented.

4. A non-transitory machine-readable storage medium on which is stored a computer program, which is executable by a processor, comprising:
   a program code arrangement having program code for securing an application programming interface of a utility program library, by causing the processor to perform the following:
      assigning, by a configuration of a hypervisor, at least one permissible call of a function, with a first version number, to at least one guest system of the hypervisor, the first version number being in accordance with the configuration of the hypervisor;
      generating source code, supported by the configuration, for a function prototype of the function, the function prototype being adapted to the guest system, and the function prototype further corresponding to the at least one permissible call;
      storing the source code for the function prototype in a header file;
      adding the header file to a guest-specific source code, the guest-specific source code having the at least one permissible call specific to the guest system, and the header file including a second version number;
      translating the guest-specific source code, including the header file, into an object code;
      while performing the translating, securing the application prototype by:
         determining whether the guest-specific source code is missing one or more function prototypes of the function;
         in response to determining that the guest-specific source code is missing the one or more function prototypes, indicating a first failure of the translation representing an otherwise incorrect object code and avoiding production of the incorrect object, code;
         in response to determining that the guest-specific source code has the one or more function prototypes:
            comparing the second version number to the first version number;
            in response to the second version number not matching the first version number, indicating a second failure of the translation; and
            in response to the second version number matching the first version number, allowing the guest system of the hypervisor to perform the at least one permissible call.

5. The machine-readable storage medium as recited in claim 4, wherein during the code generation, the utility program library is produced.

6. The machine-readable storage medium as recited in claim 4, wherein the utility program library is object-oriented.

7. A device for securing an application programming interface of a utility program library, comprising:
   a non-transitory machine-readable storage medium on which is stored a computer program, which is executable by a processor, including program code for securing an application programming interface of a utility program library by causing the processor to perform the following:
      assigning, by a configuration of a hypervisor, at least one permissible call of a function, with a first version number, to at least one guest system of the hypervisor, the first version number being in accordance with the configuration of the hypervisor;

generating source code, supported by the configuration, for a function prototype of a function, the function prototype being adapted to the guest system, and the function prototype further corresponding to the at least one permissible call;

storing the source code for the function prototype in a header file;

adding the header file to a guest-specific source code, the guest-specific source code having the at least one permissible call specific to the guest system, and the header file including a second version number;

translating the guest-specific source code, including the header file, into an object code;

while performing the translating, securing the application prototype by:

determining whether the guest-specific source code is missing one or more missing function prototypes of the function;

in response to determining that the guest-specific source code is missing the one or more function prototypes, indicating a first failure of the translation representing an otherwise incorrect object code and avoiding production of the incorrect object code;

in response to determining that the guest-specific source code has the one or more function prototypes:

comparing the second version number to the first version number;

in response to the second version number not matching the first version number, indicating a second failure of the translation; and in response to the second version number matching the first version number, allowing the guest system of the hypervisor to perform the at least one permissible call.

8. The device as recited in claim 7, wherein during e code generation, the utility program library is produced.

9. The device as recited in claim 7, wherein the utility program library is object-oriented.

* * * * *